United States Patent [19]

Zaghi et al.

[11] Patent Number: 4,597,151

[45] Date of Patent: Jul. 1, 1986

[54] FLUID PRESSURE TRANSMITTING DIAPHRAGM ASSEMBLY AND METHOD OF MANUFACTURE

[75] Inventors: Hooshmand Zaghi, Oxnard; Roy K. Kodama, Thousand Oaks, both of Calif.

[73] Assignee: Solartron Electronics, Inc., Princeton, N.J.

[21] Appl. No.: 118,455

[22] Filed: Feb. 4, 1980

[51] Int. Cl.⁴ .............................................. B23P 17/00
[52] U.S. Cl. .................................. 29/421 R; 29/454; 92/99; 92/103 M; 92/104
[58] Field of Search .............. 92/99, 103 M, 104, 105; 29/421 R, 454; 113/116 B

[56] References Cited

U.S. PATENT DOCUMENTS

| | | | |
|---|---|---|---|
| 2,912,951 | 11/1959 | Peters | 113/116 B |
| 2,913,008 | 11/1959 | Cordero | 92/104 |
| 3,026,611 | 3/1962 | DuBois | 92/104 |
| 3,443,583 | 5/1969 | Webb | 92/103 M |
| 3,624,342 | 11/1971 | Hoffman | 29/454 |
| 3,890,819 | 6/1975 | DeLuca | 29/421 |
| 3,921,556 | 11/1975 | Wood | 113/116 B |
| 4,199,991 | 4/1980 | Kodama | 29/454 |
| 4,237,775 | 12/1980 | Eisele | 92/99 |

Primary Examiner—Abraham Hershkovitz
Attorney, Agent, or Firm—Dale Gaudier

[57] ABSTRACT

A fluid pressure transmitting diaphragm assembly is disclosed in which a diaphragm support plate (14) and a force transmitting disk (16) are attached respectively to the outer flange (46) and inner flange (48) of an annular diaphragm (44) having a concave portion (50) between the flanges, the concave portion having been formed by fluid pressure acting on the diaphragm to freely deform it following hermetic welding of the flanges. A method of manufacturing such an assembly also is disclosed.

8 Claims, 6 Drawing Figures

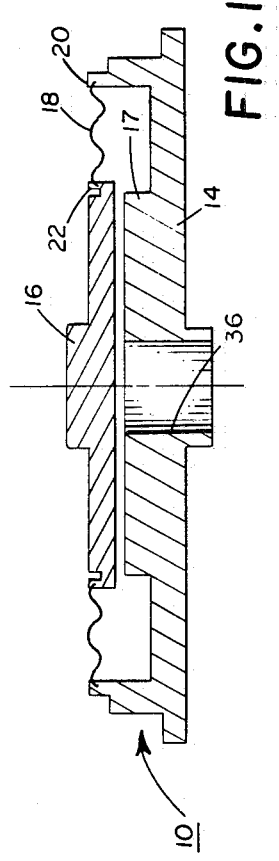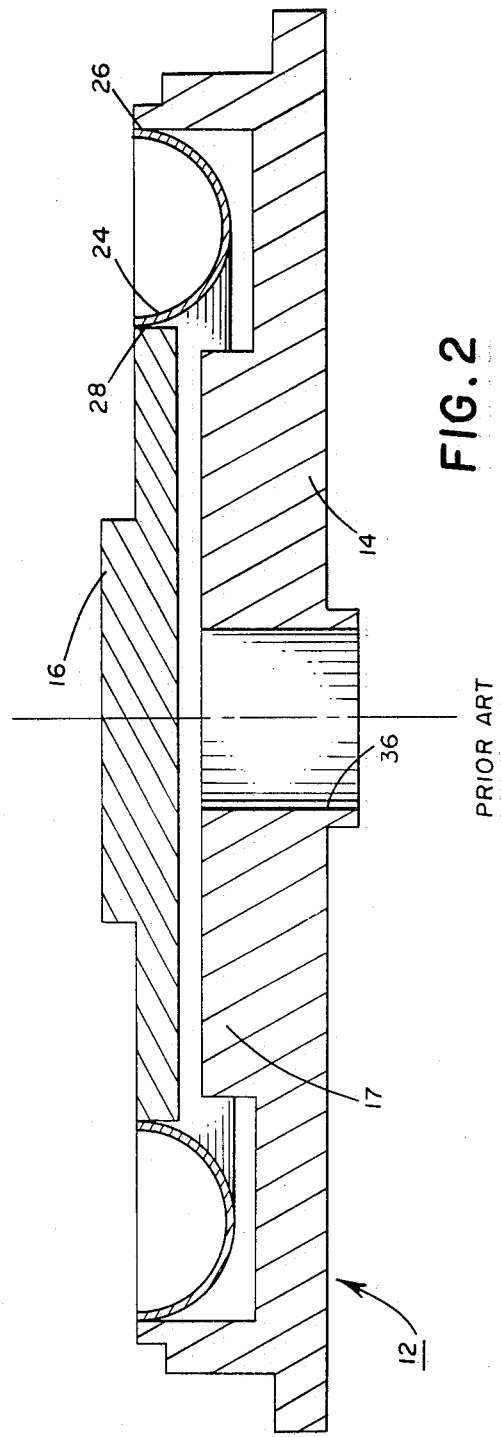

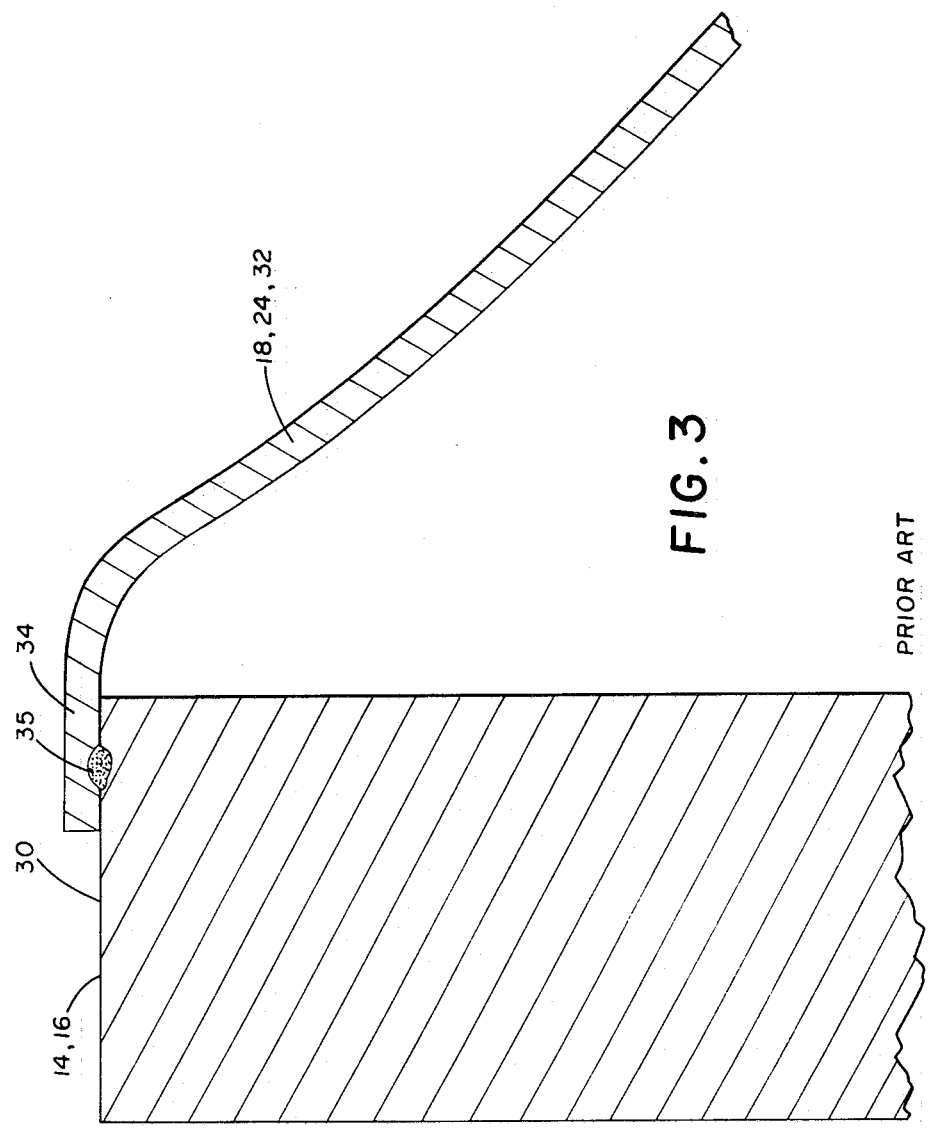

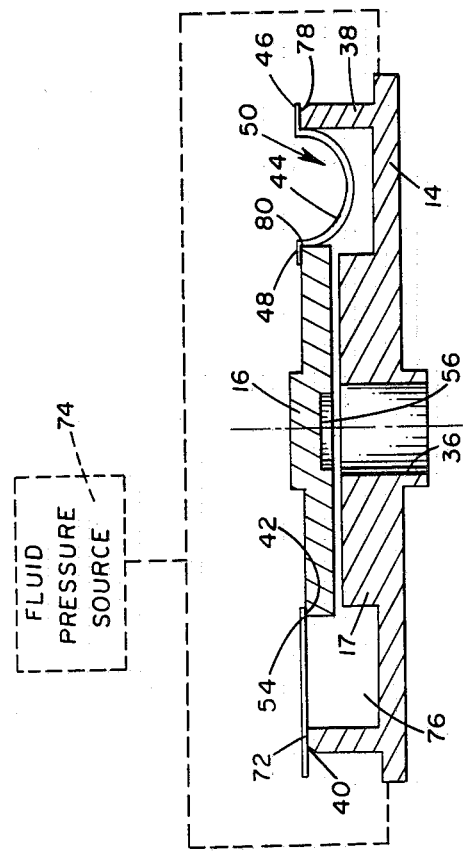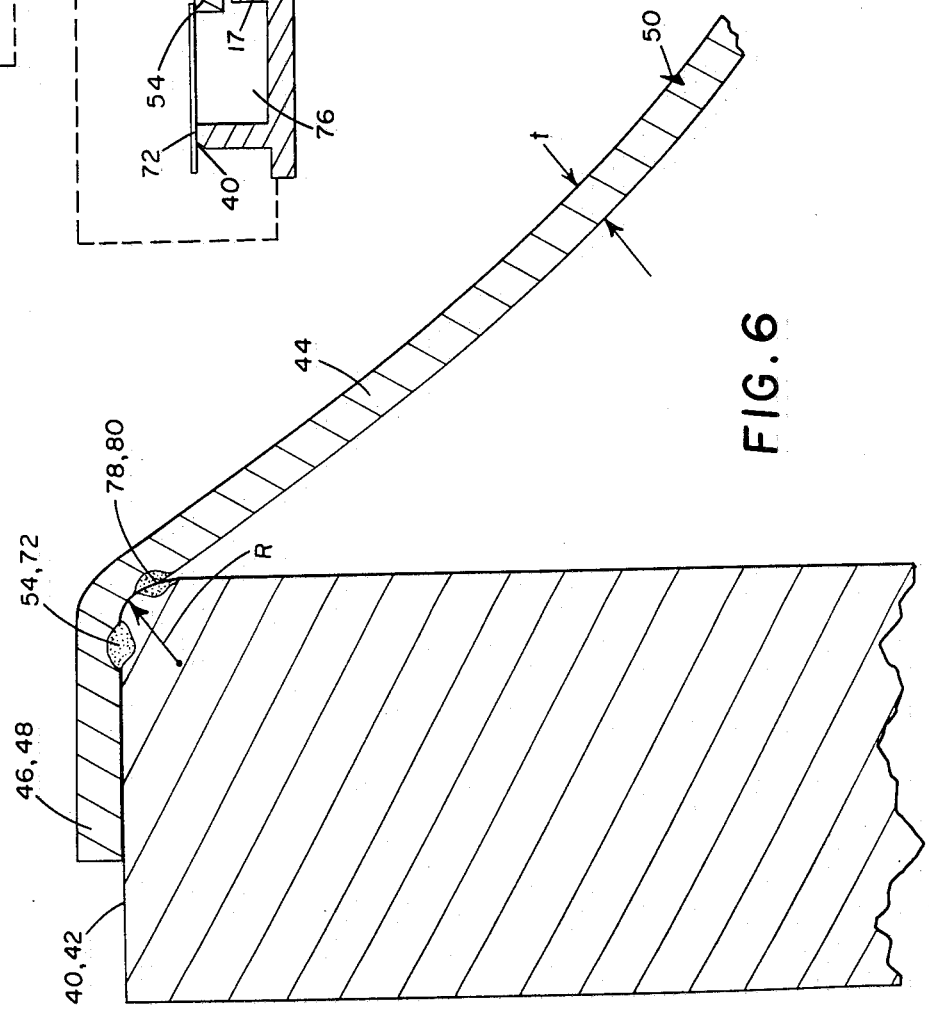

FLUID PRESSURE TRANSMITTING DIAPHRAGM ASSEMBLY AND METHOD OF MANUFACTURE

TECHNICAL FIELD

The present invention relates generally to fluid pressure transducers and particularly to the flexible diaphragms used in such devices to transmit pressure changes into mechanical movement. The invention also concerns methods for manufacturing assemblies embodying such diaphragms.

BACKGROUND ART

Pressure transducers for use in measuring changes in applied mechanical and fluid pressure have been in use for many years. Many such transducers comprise a thin resilient diaphragm which is exposed to a source of pressure to be measured so that deflection of the diaphragm as the pressure changes can be correlated to the magnitude of the actual pressure. The diaphragm typically is linked mechanically with an electro-mechanical transducer such as a strain gage beam.

In some applications where low spring rate is needed or very thin diaphragms are machined integrally with the pressure housing of the transducer, a flat diaphragm may be useful. However, these diaphragms are of limited applicability since their stiffness remains constant only for rather small deflections on the order of a fraction of the thickness of the diaphragm.

To provide improved transducer range or stiffness and yet to retain adequate linearity, preformed convoluted and torus-shaped diaphragms have been used as shown for example, in FIGS. 1 to 3, to be described herein. In some transducers, the preformed diaphragms have been provided with radial flanges for use in welding them between the transducer housing and force transmitting disk or other linkage. Unfortunately, the active portion of diaphragms having such mounting flanges has some frictional contact with the mounting surfaces of the flanges. Thus, movement of the point of contact as the diaphragm flexes causes linearity and hysteresis errors. Since the active portion of the diaphragms is larger on one side than the other, the diaphragm is not symmetric in response to pressure applied from either side. Such asymmetry limits the accuracy of the diaphragm when it is used in differential transducers. To reduce these undesirable effects, prior art transducers have embodied very precisely dimensioned preformed diaphragms which fit closely enough with their support structures to allow deletion of attachment flanges and the use of lap or butt welds at the very edge of the diaphragm between it and the surrounding structure.

To obtain such precisely dimensioned preformed diaphragms, thin, annular metal blanks have been drawn into expensive, very precisely ground dies which impart the desired convoluted or torus-like configuration. Depending on the depth of the convolutions, the spring-back characteristics of the metal and similar factors, maintenance of dimensional control of the finished diaphragm can be quite difficult, resulting in high reject rates and attendant high expense to produce acceptable diaphragms.

Where unflanged diaphragms are used, precise dimensions are needed to ensure that the weld to the housing is hermetic. A very small mismatch between the housing dimensions and the diaphragm dimensions may leave a gap or may cause some crimping of the thin diaphragm at its edges, either of which may be difficult if not impossible to seal by welding. Since leakage past the weld may not be discovered until the assembly is completed, considerable time and money may be lost.

DISCLOSURE OF THE INVENTION

A primary object of the present invention is to provide a pressure transducer diaphragm assembly in which improved linearity and reduced hysteresis errors are achieved.

Another object of the invention is to provide such an assembly in which the dimensions of the diaphragm itself do not have to be tightly controlled to ensure proper mating of the diaphragm with the other elements of the assembly during welding.

A further object of the invention is to provide a simple, less expensive method of manufacturing such an assembly.

The above objects of the invention are given only by way of example. Thus, those skilled in the art may discern other desirable objectives and advantages inherently achieved by the invention. Nonetheless, the scope of the invention is to be limited only by the appended claims. In one embodiment of the invention, a diaphragm support plate is provided which has an upwardly extending peripheral lip with an annular, radially extending sealing surface. A force transmitting disk is positioned centrally of the peripheral lip, the disk having a peripheral, radially extending sealing surface. Between the disk and the support plate is an annular diaphragm having an outer flange hermetically welded to the annular sealing surface; an inner flange hermetically welded to the peripheral sealing surface; and a central concave portion extending below the two sealing surfaces between and integral with the two flanges. The concave portion is formed in a unique fashion by applying fluid pressure to a flat, annular blank embodying said flanges, after welding the blank to the disk and the support plate, so that the blank deforms freely into an open space between the support plate and the disk.

The edges of the disk and support plate preferably are rounded where the diaphragm turns downward to form its concave portions to prevent shearing of the diaphragm, the radius of curvature preferably being from 1.5 to 3.0 times the thickness of the diaphragm. The hermetic welds on the flanges are spaced from these rounded edges but, to reduce asymmetry and other edge effects, the diaphragm may also be welded to the rounded edges following formation of the concave portion.

In the method according to the invention, a flat annular blank is provided which has an outer diameter larger than the inner diameter of the annular sealing surface, and an inner diameter smaller than the outer diameter of the peripheral sealing surface. The blank is hermetically welded to the support plate and disk and then preferably is leak tested. Then fluid pressure is applied to the blank so that it deforms freely downward into an open space between the support plate and the disk. No backing die is needed. To minimize edge effects a further weld may be made at the edges of the support plate and the disk. A centering tool and spacer are used to maintain appropriate axial spacing and concentricity between the support plate and the disk.

BRIEF DESCRIPTION OF THE DRAWINGS

FIG. 1 shows an elevational, section view through a prior art diaphragm assembly embodying a corrugated diaphragm.

FIG. 2 shows an elevational, section view through another prior art diaphragm assembly, embodying a torus-like diaphragm.

FIG. 3 shows an elevational, section view through a type of prior art weld joint between a diaphragm and its support plate or its force transmitting disk.

FIG. 5 shows an elevational, section view in which the invention is shown in an intermediate stage of manufacture on the left of the centerline and in its final stage on the right side of the centerline, the fluid pressure source for forming the diaphragm being shown schematically in dashed lines.

FIG. 6 shows an elevational, section view through a weld joint as used in the invention between the diaphragm and its support plate or its force transmitting disk.

BEST MODE FOR CARRYING OUT THE INVENTION

Figure 4:
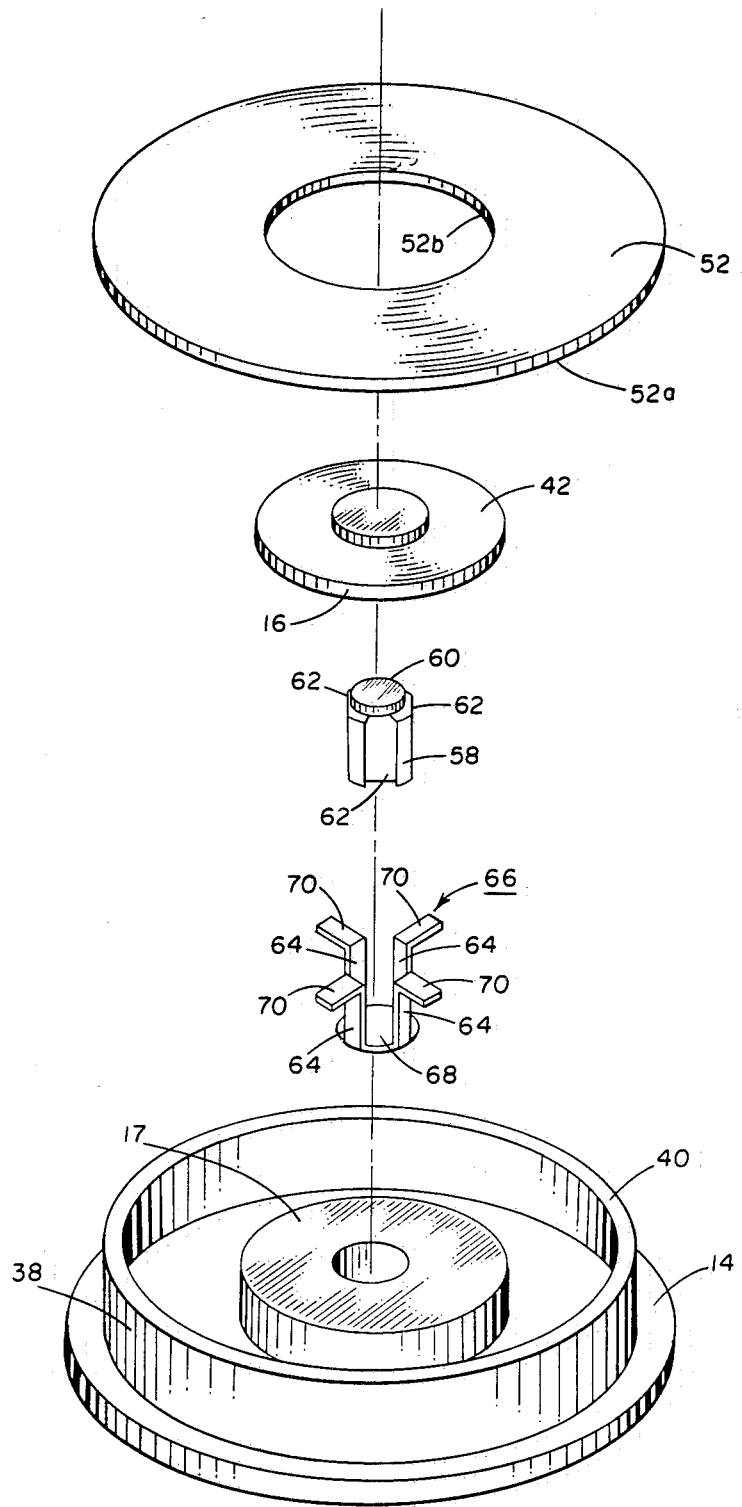
FIG. 4 shows an exploded, perspective view of various components and fixtures used to manufacture diaphragm assemblies according to the present invention.

The invention will be described with reference to the drawings, in which like reference numerals identify like elements of structure in each of the several figures.

Referring to FIGS. 1 to 3, two exemplary types of prior art diaphragm assemblies are shown. In FIG. 1, assembly 10 and in FIG. 2, assembly 12 are seen to comprise a diaphragm support plate 14 and a central force transmitting disk 16 joined to each other by a diaphragm. A preformed corrugated annular diaphragm 18 is shown in FIG. 1, which is joined to support plate 14 and disk 16 by butt welds 20, 22 which extend circumferentially around the inner and outer diameters of the diaphragm. A preformed torus-like diaphragm 24 is shown in FIG. 2, which is similarly joined to support plate 14 and disk 16 by butt welds 26, 28. In both cases, precise dimensional control is required to provide optimum assurances of acceptable welds. FIG. 3 illustrates, for example, a fragmentary view of a prior art diaphragm assembly in which a radially extending sealing surface 30 supports a preformed diaphragm 32 having a radially extending flange 34 which rests on surface 30. A weld 35 is used to seal diaphragm 32 to its associated support plate 14 or disk 16. Although dimensional control is not so exacting as in the device of FIGS. 1 and 2, errors due to edge effects are experienced as previously discussed.

In use, the devices of FIGS. 1 to 3 typically are subjected to pressure on the upper surfaces of their diaphragms, as illustrated, by suitable means not shown. Disk 16 thus moves downward, as illustrated, toward upwardly extending limit stop 17. An unillustrated linkage operatively associated with disk 16 extends away from the diaphragm to actuate a sensor such as a strain gage flexure beam, also not shown, in the familiar manner.

As mentioned, the preformed diaphragms used in the prior art devices shown in FIGS. 1 and 2 have to be made to very close tolerances to facilitate completion of hermetic butt welds 20, 22 and 26, 28. The preformed diaphragm used in the prior art device of the type shown in FIG. 3, on the other hand, is subject to undesirably large asymmetry, non-linearity and hysteresis errors. The diaphragm assembly according to the present invention reduces the cost of making such assemblies by eliminating certain difficult close tolerance requirements and also provides improved performance.

Turning now to FIGS. 4 to 6, the assembly according to the present invention may be seen to comprise an upwardly extending peripheral lip 38 on support plate 14, the lip having an annular, radially extending sealing surface 40. Force transmitting disk 16 is provided with a peripheral, radially extending sealing surface 42. Between these two sealing surfaces, a torus-like diaphragm 44 is provided which comprises a first, radially outwardly extending flange 46 positioned on and hermetically welded to sealing surface 40; a second, radially inwardly extending flange 48 positioned on and hermetically welded to sealing surface 42; and a concave, torus-like central portion 50 extended below sealing surfaces 40, 42 and formed integrally with flanges 46, 48.

Diaphragm 44 is formed uniquely according to the present invention. A thin, annular flat blank 52 is provided of a resilient material such as 17—7 PH stainless steel. Blank 52 is made to very loose tolerances so that its outer diameter 52a is sufficiently greater than the inner diameter of sealing surface 40 to permit making a circumferential hermetic weld; and its inner diameter 52b is sufficiently smaller than the outer diameter of sealing surface 42 also to permit making such a weld. During assembly, blank 52 is hermetically welded to disk 16 at circumferential location 54.

Disk 16 includes a shallow counterbore 56 in its underside, as illustrated. A centering plug 58 is provided which has an upwardly extending boss 60 sized to fit into bore 56. Plug 58 also is provided with a plurality of axially extending flats 62 along its sides which are arranged to mate with the flat legs 64 of a spacer 66. Each of legs 64 extends upwardly from a base 68 and terminates in a radially outwardly extending spacer tab 70 whose thickness corresponds to the desired undeflected spacing between disk 16 and limit stop 17. Spacer 66 preferably is made by stamping from sheet metal.

Following welding of blank 52 to disk 16, spacer 66 is slipped into bore 36 and centering plug 58 is dropped into spacer 66. Disk 16 then is fitted over plug 58 with boss 60 in bore 56. Blank 52 is then hermetically welded to sealing surface 40 at circumferential location 72. The welded assembly preferably is leak tested at this point and rewelding may be accomplished, if necessary. After successful leak testing and rewelding, any excess material on blank 52 is trimmed off.

The welded assembly is then placed in a pressurization fixture 74, as illustrated schematically in FIG. 5. Fluid pressure applied to the top surface of blank 52 will cause it to deform freely, downwardly into the open space 76 defined between disk 16 and support plate 14 as shown on the right side of FIG. 5. Spacer tabs 70 maintain the necessary spacing between disk 16 and support plate 14 during pressurization. No back up or forming dies are required, as the blank will automatically form into a torus-like configuration. Depending on the convolution depth desired and the elongation properties of the blank material, an intermediate anneal and repressurization may be necessary. Because blank 52 is stressed beyond the yield point of its material, springback of the blank is virtually eliminated. The absence of such springback means that the inner and outer edges can be maintained at the same height under zero deflection. That is, the diaphragm will be unbiased at zero deflection. Thus, any differential thermal expansion of the parts should not cause zero shifts of disk 16.

FIG. 6 illustrates how the edges of sealing surfaces 40, 42 preferably are rounded to prevent shearing of the thin diaphragm, with a radius R of approximately 1.0 to 3.0 times the thickness t of the diaphragm. The preferred radius on actual products has been found to be 1.5t. To minimize asymmetry and other edge effects, circumferential welds 78, 80 are then made near the point where the diaphragm curves away from the sides of disk 16 and support plate 14. Finally, legs 64 are cut free from base 68 so that centering plug 58 and the legs can be removed through bore 36.

In one actual embodiment of the invention, in which a center deflection of 0.0038 inches under 100 inches of water pressure was required, a 0.0037 inch thick blank of 17—7 PH stainless steel was used. Disk 16 and support plate 14 were machined from 17—7 PH and 17—4 PH stainless steel, respectively, with diameters of 1.0 and 1.5 inches respectively. A pressure of 2000 psi was applied to the upper surface of the blank for 0.5 minutes, after which the assembly was annealed for 1.0 hour at approximately 1900° F. Pressure of 2000 psi was again applied for 0.5 minutes until a convolution depth of 0.080 inches was developed. The resultant assembly had a linearity of less than 0.1% of full scale and a hysteresis error of less than 0.1% of full scale. The thermal zero error of the assembly was determined to be less than 0.2% of full scale.

INDUSTRIAL APPLICABILITY

Pressure transmitting diaphragm assemblies according to the invention may be used in a variety of liquid and gas pressure transducers and are also suitable for use in mechanical force transducers. The method of manufacture according to the invention is similarly applicable.

Having described our invention in sufficient detail to enable others to make and use it, we claim:

1. A method of assembling a fluid pressure transmitting diaphragm assembly of the type used in pressure transducers, said method comprising the steps of:
    providing a diaphragm support plate having an upwardly extending peripheral lip with an annular, radially extending sealing surface;
    providing a force transmitting disk having a peripheral, radially extending sealing surface;
    providing a thin flat, annular blank of resilient material having a central opening and a peripheral edge;
    hermetically welding said force transmitting disk within said central opening, the weld being between said blank and said peripheral sealing surface;
    hermetically welding said blank to said support plate, the weld being between said blank and said annular sealing surface; and
    applying fluid pressure to said annular blank following said welding to cause a free deformation of said blank into open space for forming a downwardly extending segmentally toroidal concave portion in said blank between said sealing surfaces.

2. A method according to claim 1, further comprising the step of:
    rounding the radially inner edge of said annular sealing surface and the radially outer edge of said peripheral sealing surface with a radius in the range of from 1.5 to 3.0 times the thickness of said blank.

3. A method according to claim 2, further comprising the step of:
    welding said blank to the rounded portions of said sealing surfaces after formation of said concave portion.

4. A method according to claim 1, wherein said open space extends between said support plate and said force transmitting disk.

5. A method according to claim 1, further comprising the step of spacing said disk a predetermined distance from said support plate while applying said fluid pressure.

6. A method according to claim 1 including the further step of annealing the formed blank and repeating the pressure-forming step subsequent to the annealing step.

7. A method according to claim 1 including the further step of welding the formed blank to the disk at a position wherein the concave portion extends away from the disk.

8. A method according to claim 1 including the further step of welding the formed blank to the support plate at a position wherein the concave portion extends away from the support plate.

* * * * *